July 12, 1938. A. E. CLARK ET AL 2,123,230
MACHINE FOR MAKING PIE RIMS
Filed Sept. 9, 1935 4 Sheets-Sheet 2

INVENTORS
Arthur E. Clark
and John F. Kohler
BY
Charles G. Hensley
ATTORNEY

July 12, 1938.　　　A. E. CLARK ET AL　　　2,123,230
MACHINE FOR MAKING PIE RIMS
Filed Sept. 9, 1935　　　4 Sheets-Sheet 3

INVENTORS
Arthur E. Clark
and John F. Kohler
BY Charles G. Hensley
ATTORNEY

Patented July 12, 1938

2,123,230

UNITED STATES PATENT OFFICE 2,123,230

MACHINE FOR MAKING PIE RIMS

Arthur E. Clark, Freeport, and John F. Kohler, New York, N. Y.

Application September 9, 1935, Serial No. 39,802

13 Claims. (Cl. 107—1)

The present invention relates to a machine for making pie rims, that is to say, a sheet of dough is placed upon a pie plate and the present machine serves to shape and crimp the dough as well as trim off the excess dough to form the rim around the edge of the plate. This so-called rim forms the bottom crust when baked, for an open or uncovered pie; that is to say, a pie which has only an under crust and no cover. It is customary to provide a scallop or decorated edge around the rim of the crust either by hand or by machinery. The present machine is designed to form the decorative rim in a more perfect manner than heretofore made by machinery.

In former rimming machines the rimming devices have been subject to the disadvantage that if the plates were not accurately centered in relation to the rimming device, the latter would, in its operations, deform the plates around the edges so that such plates could no longer be used in the rimming machine but had to be culled out, and the injured plates were used only for making covered pies. This required the services of an operator to cull out the injured plates, besides other inconveniences and annoyances caused by the injury to the plates in the rimming machine.

In prior machines the rimming device approached the plate or the plate approached the rimming device in a vertical direction, and if the plate were not accurately centered the rimming device produced a crushing effect on the edge of the plate and deformed it.

In the present machine the rimming device approaches the plate in a lateral direction and the plate, while sufficiently held to permit the rimming device to carry out its function, is nevertheless subject to a slight lateral displacement so that its actual position is controlled more or less by the rimming device.

If the plate is slightly inaccurate in shape, or if it is slightly oversize, the plate may be slightly shifted laterally while the rimming device is acting thereon, so that because of the lateral approach of the trimming device and the slight permissible movement of the plate laterally, the plate is not subject to injury by the rimming device. The plates may therefore be repeatedly used in the present machine without injury or distortion by the machine, and it is no longer necessary to cull the plates to separate deformed from the perfect plates.

In addition, the present machine is more accurate and perfect in its formation of the rim from the dough. The machine is entirely automatic in its operation and the only manual labor involved is that of feeding the pie plates, with a sheet of dough lying thereon, onto the carriers of the machine all operations thereon being performed automatically by the machine. Other advantages and objects will be set forth in the following detailed description of our invention.

In the drawings forming part of this application,

Figure 2 is a similar view taken from a point 90° from the position at which Figure 1 is taken, Figure 7 is a sectional view taken on the line 7—7 of Figure 3, Figure 8 is a sectional view taken on the line 8—8 of Figure 1, Figure 9 is a sectional view taken on the line 9—9 of Figure 8.

The machine is shown as of circular form, although it will be understood that it may be made as a straightway machine if desired. In the embodiment illustrated in the drawings the machine is mounted on a frame consisting partly of the four legs 1 which rest upon the floor and which support in elevated position the table or platform 2 of circular form and around which table and above the same revolves a turret which carries the plate holders. The legs are connected across by a motor support 3 on which the motor 4 is mounted and which latter serves to operate the various movable parts of the machine. On the shaft of this motor there is a pinion 5 which meshes with and drives a larger gear 6 which is fixed to a shaft 7 extending crosswise of the machine and mounted in suitable bearings carried by the legs of the frame.

A hand wheel 8 is shown mounted on the end of this shaft for the purpose of turning it over when the motor is shut off, for bringing the turret to any desired position. From the shaft 7 power is distributed to the different working parts of the machine as will be hereinafter set forth.

On the table or platform 2 there is centrally mounted a tubular post 9 and there is arranged to revolve around this post a turret consisting partly of the radial frames or brackets 10 projecting outwardly from a central sleeve 11. The latter is arranged to revolve around a cylindrical sleeve 12 which is itself secured to the central post 9. Resting on a boss 13 extending upwardly from the table 2 is a bearing ring 14 which is secured against rotation to the sleeve 12 by means of a set screw 15. On this bearing ring rests an annular gear 16 which also lies just under the hub of the turret and this gear is secured to the latter hub by means of bolts 17 passing through gears projecting from the hub of the turret so that as the annular gear is revolved the turret revolves with it.

The operating force for revolving the annular gear 16 and the turret is conveyed thereto as follows: The cross shaft 18 mounted in the boss 19 in the brackets 20 supported from the table is revolved by power derived from the main shaft 7 through the endless chain 21 operating around the sprocket 22 on the shaft 7 and the sprocket 23 on the cam shaft 24. On the cam shaft 24 there is a small gear 25 which meshes with the gear 26 on the shaft 18 to drive the latter. On the shaft 18 there is a mitre gear 27 which meshes with and drives the mitre gear 28 and the latter is mounted on the lower end of the vertical shaft 29 which extends through a hub 30 having a flange 31 bolted to the under side of the table by the bolts 32. This shaft extends upwardly through the table and at its upper end there is attached to it a gear 33 which meshes with and drives the larger annular gear 16 and therefore the turret.

The gears 33 and 16 are members of what is known as a "Geneva" movement so that the annular gear 16 is driven intermittently and in the particular embodiment of our invention illustrated there are four dwelling points or positions in the "Geneva" movement, so that for each complete revolution of the gear 33 the annular gear 16 will be rotated 90° or, in other words, four complete revolutions of the gear 33 are required to rotate the gear 16 one revolution. To correspond with this arrangement there are four plate holders arranged 90° apart around the turret, allowing four stations or positions for the performance of four different functions in the operation of the machine.

Figures 3, 4:
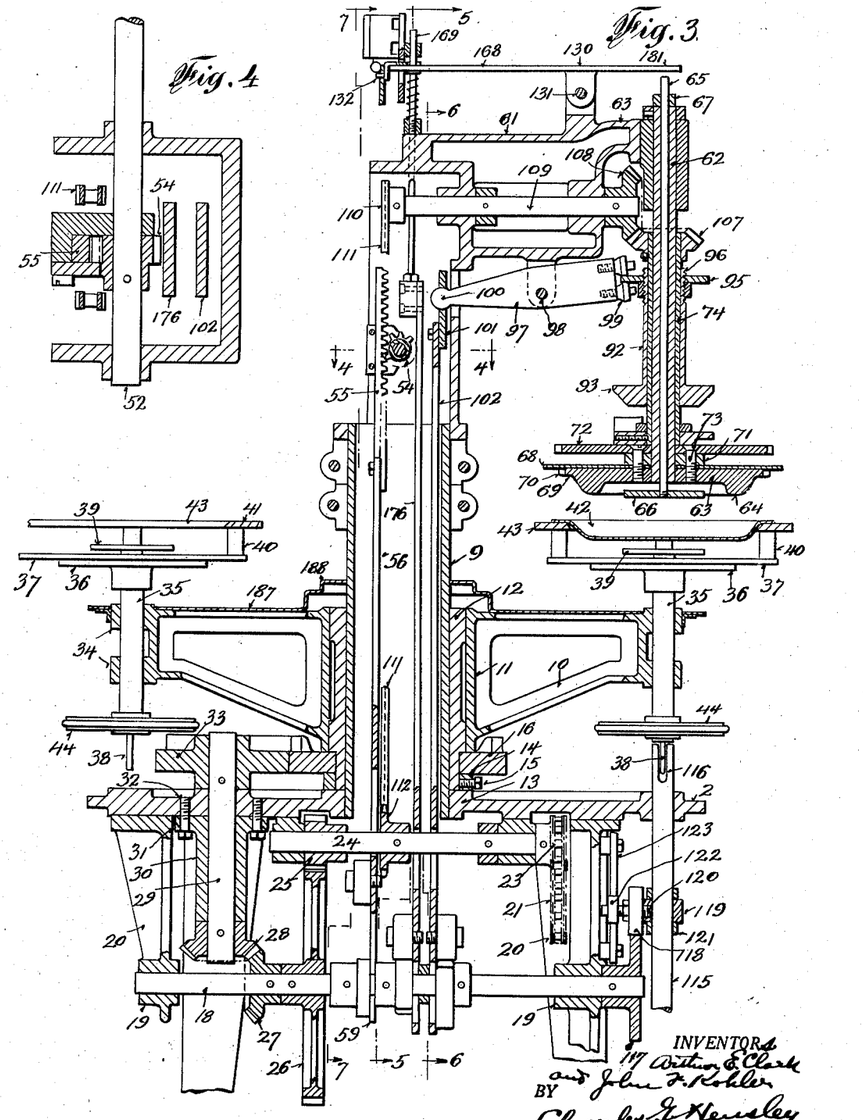
Figure 3 is a vertical, sectional view taken on the line 3—3 of Figure 1.
Figure 4 is a sectional view taken on the line 4—4 of Figure 3.

Each of the radial brackets 10 has on its outer end a pair of bearings 34 in which is rotatably mounted the vertical shafts 35, the shafts being adapted to rotate in the bearings and also to move vertically up and down therein. On the upper end of each of these shafts there is mounted a supporting member 36 and attached to and resting on this member is a plate 37 having a central aperture through which extends a spindle 38 which also projects downwardly through the shaft 35 with its lower end projecting below the lower end of this shaft, as shown in Figure 3.

On the upper end of this spindle there is mounted a head or plate 39 which is adapted to act to lift the pie plates to permit them to be ejected from the plate holder as will be hereinafter pointed out. On the top of the supporting plate 37 there are arranged short posts 40 which support an annular ring 41 in spaced relation above the plate 37; and this annular ring is of such diameter as to receive in its central aperture a pie plate 42 in the relation shown in Figure 3, that is to say, the receptacle portion of the plate extends down through the opening 43 of the annular ring, whereas the flange of the plate rests on the top of this ring, the plate being thus centered in relation to the rimming device, to be hereinafter described.

There is shown attached to the hollow shaft 35 a wheel 44 having a rubber or leather tire which is adapted to engage a rough surfaced track 45 of arcuate shape which is bolted to the table of the machine and which is of sufficient length to cause several revolutions of the shaft 35 and therefore the plate carrier, for the purpose of carrying out certain functions which need not be described as they are well known and do not affect the portion of the machine to which our invention is applied.

As stated above, in the embodiment of our invention shown herein the turret carries four of the plate holders, all of which may be constructed as just described, and by reason of the "Geneva" movement the turret stops or dwells at four different positions. In the position A, indicated in Figure 10, an empty plate holder receives thereon a pie plate with a sheet of dough laid upon it which is to form the bottom crust of the pie. At the position B a dusting device will dust flour upon the top surface of the dough so that the rimming device in its operations will avoid the dough clinging to it. At position C the crimping device comes into action and crimps the dough to form the fluted rim. At position D the plate holder and plate are revolved one or more times while the excess dough or scrap is swept away by the scraping knife 46 carried by the plate holder; and between the position D and the position A the stationary arm 47 engages the plate which is lifted by the lifter 39 so that as the turret moves, the plate is swept off its holder onto any suitable support disposed as a receiver.

The dusting device is shown as a receptacle 48 supported by brackets 49 from the central structure of the machine and in position to be over the plate and dough when the latter dwell at the position B.

The receptacle is provided with a sifting bottom or screen, so that flour will dust through the screen onto the top of the dough carried by the pie plate under the action of an agitator 50 mounted adjacent the perforated bottom wall of the flour receptacle. This agitator is carried on a vertical shaft 51 which is revolved from the shaft 52 through the mitre gears 53.

The shaft 52 extends to a point over the axis of the post 9 where it is provided with a pinion 54 which meshes with and is driven by a vertically reciprocating rack 55. The latter is bolted to an upright bar 56 the lower end of which is provided with a slot 57 to straddle the shaft 24. The lower end of this bar is provided with a fork 58 which straddles the shaft 18. On this latter shaft there is a revolving cam 59 which acts on the anti-friction roller 60 attached to the face of the bar 56 so that at each revolution of the shaft 18 the cam acts on the roller to lift the bar 56 thereby lifting the rack bar 55 and acting through the pinion 54 to oscillate the shaft 52 and thereby operate the agitator 50. This motion takes place at the time the plate is dwelling in its plate holder at the position B. After the flour has been dusted on the top of the dough, the plate holder advances with the turret to the position C where the rimming action takes place.

The rimming device is as follows: There is an overhanging bracket structure 61 extending radially from the central post to form a support in an overhead position to support the parts of the rimming device where they will act upon the plate and dough at the time they are in the position marked C. There is a vertically arranged, hollow shaft 62 having its bearing in a hub 63 formed on the outer end of the bracket 61.

This hollow shaft extends vertically downwardly and at its lower end it has attached to it what may be called a die member 63 which is shaped to provide a rounded shoulder 64 adapted to press against the dough where it covers the frusto conical wall of the plate. This shaft and the die member do not revolve nor, in the construction illustrated, does the plate holder revolve while it is in the position C where the crimping device performs its operation.

There is a rod or spindle 65 extending through the bore of the hollow shaft 62 and adapted to move vertically therein. On the lower end of this rod there is attached an ejector plate 66 which is adapted to engage on the top surface of the dough where it rests on the bottom wall of the plate. The upper end of this spindle carries a collar 67 which is attached thereto and which rests on the top end of the hollow shaft 62 when the spindle is in its lowermost position or in the position shown in Figure 3, where the ejector plate 66 is slightly below the bottom edge of the die. On the top surface of the die member 63 there is mounted a thin plate 68 which is of slightly larger diameter than the die. The outer flange or edge 69 of the die is provided with a number of teeth 70 similar to gear teeth, which forms one of the co-operating crimping members.

There is a spacing member or washer 71 resting on the top face of the plate 68 and on top of this washer there is a gear wheel 72 the parts, including the die member 63, the plate 68, the washer 71 and the gear 72 all being secured together by the screws 73 and these parts all being mounted on the lower end of the non-revolving, hollow shaft 62. There is a hollow shaft or sleeve 74 which is mounted over the stationary shaft 62 and about which it is adapted to be revolved. To the lower end of this sleeve 74 there is attached a horizontally disposed circular plate 75.

On the top face of this latter plate or disc there is attached a plate 76 which has two plates 77 attached to its top surface to form guides for radially extending slider 78, the latter having an elongated central opening 79 to straddle the shafts 62, 74 and spindle 65 and to permit the slide to move radially a slight extent.

On the plate 75 there is also secured a bracket 80 by means of the screws 81, which bracket has an angular portion, on the end of which is mounted a shaft 82; and on this shaft there is revolvably mounted a gear wheel 83 which meshes with the stationary gear 72. When the disc 75 revolves, it carries this gear 83 in a planetary movement around the stationary gear 72 and this causes the gear 83 to be revolved. There is a link 84, one end of which is pivotally connected with and is adapted to pivot around the shaft 82 which carries the gear 83. To the intermediate portion of this link there is secured a shaft 85 on which is mounted the pinion 86 which meshes with and is driven by the gear 83.

This intermediate gear also meshes with and drives the gear 86 mounted on the vertical shaft 87 at a point where one end of the link 84 is pivotally connected with the slide 78. This slide is adapted to be moved substantially radially in relation to the plate 75 but as it is pivotally connected to the link 84 its left hand end as viewed in Figure 13 will move concentrically with the shaft 82. There is sufficient play between the slide and the guides 77 and the bracket 80 to permit the slide to rock slightly as it pivots about the shaft 82. The gear 83 is always in mesh with the stationary gear 72 and therefore all of the gears 83, 86 and 86ª are revolved whenever the plate 75 revolves. On the same shaft 87 which carries the gear 86ª there is a small toothed member 89 similar to a gear, and this co-operates with the teeth of the gear member 70 to crimp the dough between them.

Figures 10, 11, 12, 13:
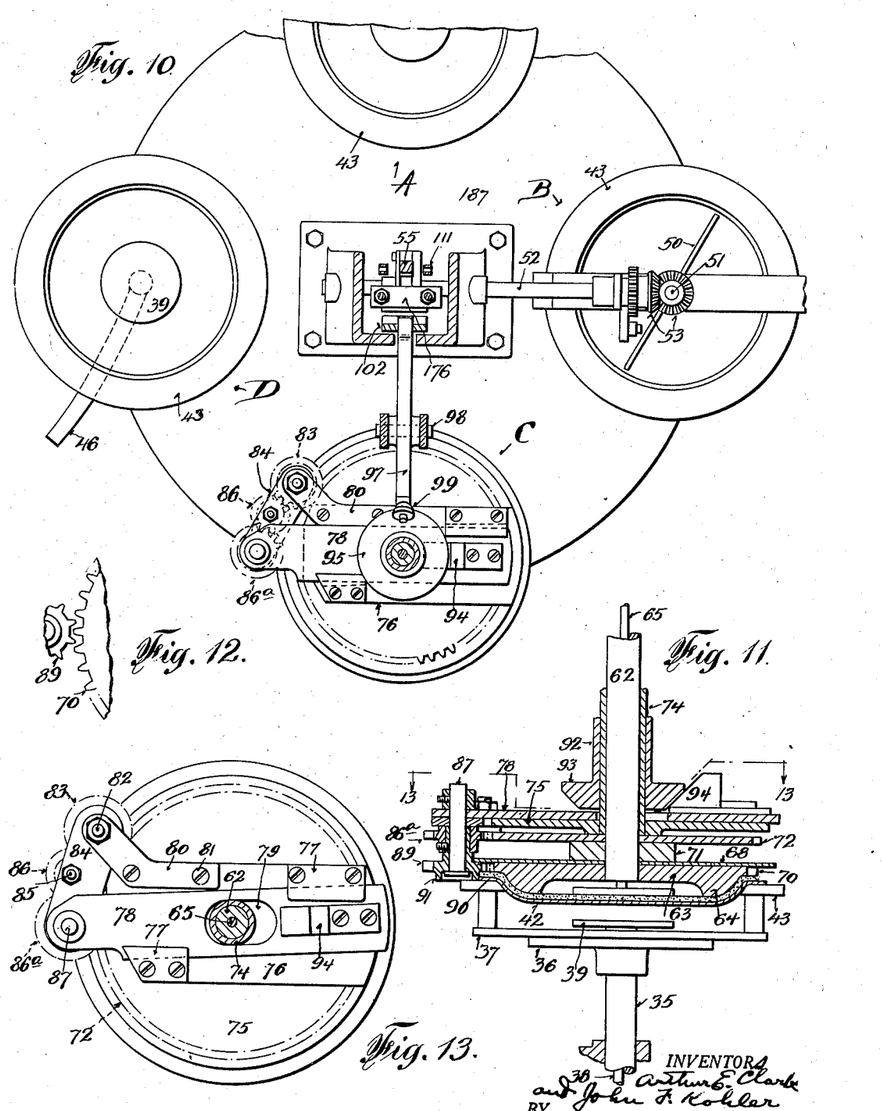
Figure 10 is a sectional view taken on the line 10—10 of Figure 1.
Figure 11 is a detailed, sectional view of parts of the crimping device.
Figure 12 is a plan view of portions of the rim forming gears.
Figure 13 is a sectional view taken on the line 13—13 of Figure 11.

They do not mesh closely like gear teeth but are spaced to provide a zigzag opening, as shown in Figure 12 in which space the dough is pressed as the members 70, 89 revolve, to form a crimped edge or flange around the dough adjacent the edge of the plate or over the flange 90 of the plate. As these toothed members 70, 89 do not drive each other they are maintained in open mesh relation during their revolution by the action of the several gears 83, 86, 86ª. The under side of the toothed member 89 is provided with a hub or boss 91 which rolls against the extreme outer edge of the plate for the purpose of severing the dough in register with the edge of the plate at the same time that the rim is being formed.

The slider 78 is periodically moved from the left hand position shown in Figure 13 by the device which we will now describe. When the parts are as shown in Figure 10 the slide is in its left hand position and therefore the link 84 is held in such position that the gear 86ª is out of mesh with the gear 72 and the toothed member 89 is out of co-operative relation or is moved away from the stationary toothed member 70, although the three gears 83, 86, 86ª are in mesh and the gear 83 is in mesh with the stationary gear 72. When the slide is moved to the right or to the position shown in Figure 13, the toothed member 89 is moved into co-operative relation with the toothed member 70 and while this relation obtains, these toothed members co-operate to press the dough between them to form the fluted flange or rim of the pie dough.

There is an outer sleeve 92 which is mounted over the sleeve 74 and it is adapted to move upwardly and downwardly thereof. The lower end of this sleeve is provided with a frusto conical cam member 93 of circular form, the slanting edge of which is adapted to engage the cam member 94 which is attached to the top of the slide member 75.

When the sleeve 92 moves downwardly, the cam member 93 acts upon the cam member 94 attached to the slide and it thereby causes the slide to be moved from its left hand position shown in Figure 10 to the right hand position shown in Figure 13, which movement of the slider swings the link 84 and it also brings the toothed member 89 into co-operative relation with the toothed member 70 to permit the crimping operation to be carried out.

The up and down movement of the sleeve 92 is effected by the following device. There is a flange or ring 95 threaded onto the upper threaded portion of the sleeve 92 to project laterally therefrom, and the position of this flange may be adjusted by screwing it up or down on the sleeve and it is locked in any given position by the lock nuts 96 which are also threaded onto the sleeve. There is a lever 97 rocking on a pivot 98 supported from the overhanging bracket of the machine and on one end of this lever there are mounted rollers 99 which engage respectively the upper and lower surfaces of the flange 95. The other arm of this lever extends through an opening in the central post of the machine where it is provided with a knuckle end 100 engaging a reciprocating plate 101.

To this plate, which is mounted within the central post of the machine, there is attached a vertical rod 102 which extends downwardly and is provided with an elongated slot 103 through which the shaft 24 extends. The bottom end of this rod is provided with another elongated slot 104 which straddles the shaft 18. On the latter shaft there is a cam 105 which at each revolution of the shaft 18 acts on the antifriction roller 106 carried adjacent the lower end of the bar 102, the shaft lifting the bar and the plate 101 and thereby rocking the lever 97 in a direction to first lower the sleeve 92, after which the cam allows the rod 102 and the lever 97 to rock in a reverse direction and thereby lift the sleeve 92.

These up and down movements of the sleeve 92 cause the cam 93 to act on the cam member 94 to move the slide in one direction. The return movement of the slide to the position shown in Figure 10 is effected by centrifugal action although a spring may be employed for this purpose if desired.

The sleeve 74 which is revolvable and which carries the plate 72 is operated in the following manner: On the upper end of this sleeve there is mounted a mitre gear 107 which meshes with and is driven by a mitre gear 108 arranged on the end of a horizontal shaft 109 which has its bearings in portions of the overhanging frame 61. On the opposite end of this shaft and within the central post of the machine there is a sprocket wheel 110 around which engages the vertically disposed chain 111. This chain, which is endless, extends downwardly and around the sprocket wheel 112 which is mounted on the shaft 24. From this shaft, therefore, power is transmitted to revolve the hollow shaft or sleeve 74 continuously.

The rimming device parts supported by the overhanging frame of the machine remain at the elevation shown in Figure 3 and in order to present the pie plate with the dough against the mould member 63 we provide means for lifting the plate holder at the rimming station as follows: There extends downwardly from the table 2 a bracket 114 having at its lower and horizontally extending end a hub in which a vertically disposed shaft 115 has its bearing. The upper end of this shaft has a bearing in a boss of the table 2. The shaft is adapted to be reciprocated vertically and it is provided with a lateral slot 116 to permit the spindle 38 carried by each plate holder to pass into the slot edgewise; and afterwards pass through the other side of it.

The upward movement of the shaft 115 is adapted to lift the plate carrier so that the pie plate with the dough thereon is pressed against the under side of the mould 63 where it is held while the rim is being formed; and afterwards the shaft 115 descends.

On the shaft 18 there is a cam 117 which at each revolution of the shaft 18 acts on the antifriction roller 118. This roller is connected to a bolt 120 in a block 119 through which the shaft 115 passes, and there are collars 121 fixed to the shaft 115 above and below the block 119. The bolt 120 on which the roller 118 is mounted also carries a roller 122 which travels between the vertical guides 123 bolted to the frame of the machine and this prevents the block 119 and bolt 120 from revolving around the shaft 115 and it prevents the shaft 115 from turning so that the slot 116 is always in position to receive the spindles 38.

Figures 2, 7, 8, 9:
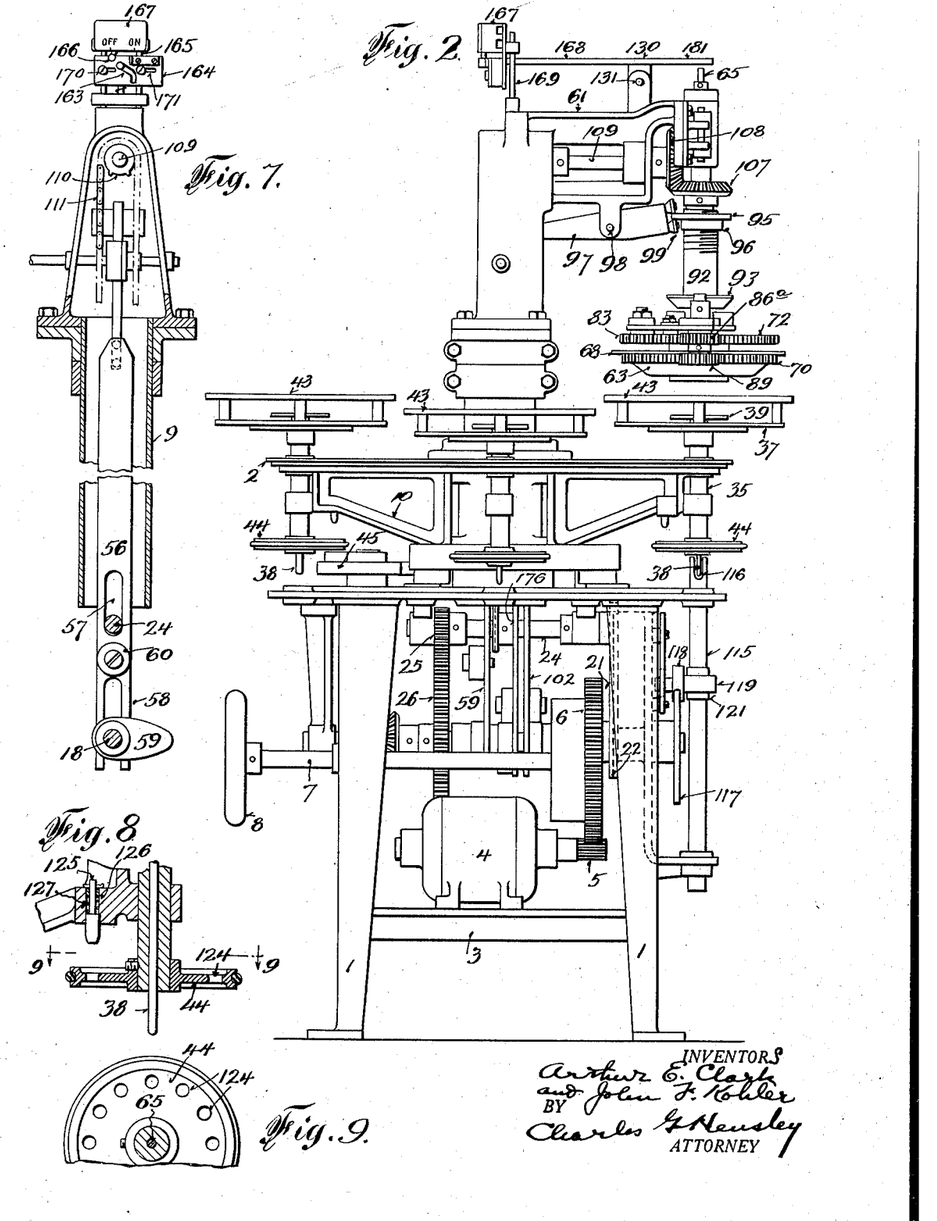

As the rimming device planetates around the plate 2 during the rimming operation, it is desirable to lock the plate holder against rotation during the rimming operation. As shown in Figures 8 and 9, the wheels 44 which are attached to the shaft 35 of the plate holders are provided with a number of apertures 124 arranged in circular form around the same. In the radial arms 10 of the turret there are arranged small spring plungers 125 in vertical bores 126 these plungers being urged downwardly by a coiled spring 127 arranged in the bores and compressed between the nut 128 and the head of the plunger.

The plunger is in line with the circularly arranged apertures 125 of the wheels 44 so that when the plate holder is lifted by the upward movement of the shaft 115 to bring the plate and dough against the mould 63 if the plunger 125 happens to be in register with one of the apertures 124 it will enter that aperture and thus lock the plate holder against rotation while the rimming operation is taking place. If the plunger should happen to align with the metal between two of the apertures 124 then when the plate holder moves upwardly the plunger will be retracted against the opposition of the spring 127.

If, however, the plate holder starts to revolve as a result of the action of the rimming device on the plate, as soon as one of the apertures 124 registers with the locking plunger 125 the latter will be forced downwardly by its spring into the aperture, thereby locking the plate holder against further revolution. This locking action continues until the plate holder moves downwardly when the shaft 115 goes down.

The slot 116 in this shaft allows the spindle 38 to move laterally therein and into the axial line of the shaft 115 during the time the plate holder is being lifted, and after the return or downward movement of the shaft 115 and the plate holder, the spindle 38 may move out of the opposite side of the slot 116 as the turret carries the plate holder away.

We have provided means for stopping the machine if the member 66 for ejecting the plate from the mould should fail to properly eject the plate. It will be noted that the spindle 65 projects at the top above the end of the shaft 62 where it is in the path of one arm of the lever 130 which is pivoted at 131 to the overhanging portion of the frame.

The other arm of the lever 130 extends to the left in Figures 2 and 3 and on the extreme end of this arm there is a pin 132 which extends through the angular slot 163 of the plate 164 which is mounted to slide horizontally. This plate carries a projecting member 165 which moves in the path of the electric switch arm 166 which is pivoted within the switch box 167 and serves to turn on and off the current of the motor which operates the machine. Downward movement of the lever arm 168 under certain conditions will cause the pin 132 acting in the angular slot 163 to move the sliding plate 164 from right to left in Figure 7 to swing the switch arm 166 from on to off position. The return movement of the switch from off to on position must be accomplished by hand when the machine is to be started.

The switch box is mounted on the upper ends of the two vertical rods 169 to move up and down with these rods; and the sliding plate 164 is also secured to these rods by screws 170 engaging in the elongated slots 171 of the sliding plate so that the plate may slide horizontally when it moves up and down with the rods 169.

There is a collar 172 through which both the rods 169 extend, the collar being secured to the rods by set screws below the sliding plate 164. There is a pin 173 having one end screwed into this collar 172 and the other end extending up through a bearing member 174 on the back of the switch box. This pin also passes through the lever arm 168 and there is a coiled spring 175 surrounding the pin and compressed between the collar 172 and the lever arm.

Figures 1, 5, 6:
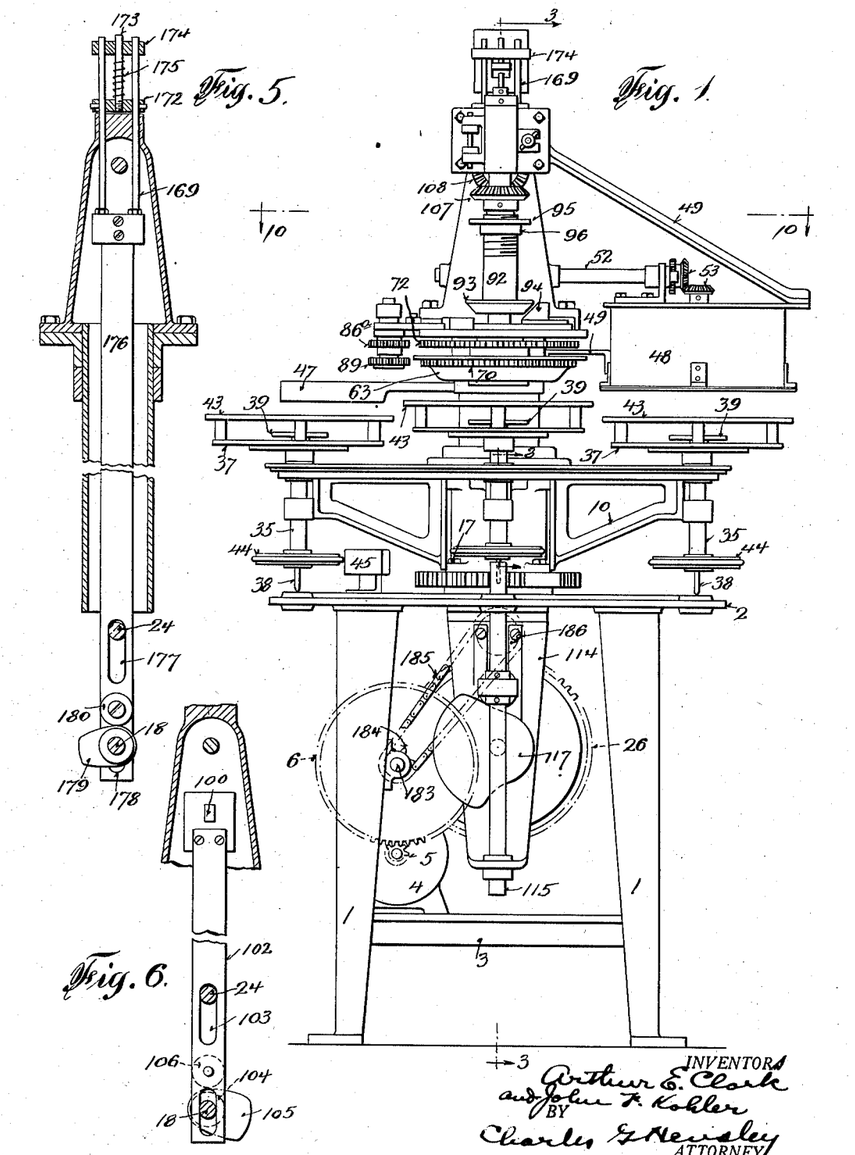
Figure 1 is an elevation of the machine looking at that side which contains the rimming device.
Figure 5 is a sectional view taken on the line 5—5 of Figure 3.
Figure 6 is a sectional view taken on the line 6—6 of Figure 3.

The rods 169 are mounted on the upper end of the bar 176 which extends downwardly through the central post of the machine as shown more clearly in Figures 3 and 5. This bar has an elongated slot 177 which permits the bar to straddle the shaft 24 and it has a lower slot 178 permitting it to straddle the cam shaft 18. On the cam shaft there is a cam 179 which operates on the antifriction roller 180 mounted on the bar 176 so that the latter is lifted and lowered once for each revolution of the cam shaft.

This up and down movement of the bar 176 causes the lever 130 to rock up and down so that the arm 181 of this lever follows the up and down movement of the spindle 65 providing the latter operates in its normal manner. During this normal operation, however, the lever arm 181 does not necessarily come into contact with the spindle 65 but it preferably travels close to it but in spaced relation, as shown in Figure 3.

This rocking of the lever 130 is so timed that when the spindle 65 and the ejector 66 carried by it moves downwardly to eject the pie plate from the mould 63, the lever arm 181 follows the spindle 65 downwardly and conversely, when the spindle rises as when the plate is pressed upwardly against the ejector 66, the lever arm 181 also rises by reason of the following movement referred to above. If, however, the ejector 66 should not move downwardly under the action of the spring 182 at the time the plate holder is lowered, it will fail to eject the plate from the mould 63 and if this condition were not corrected it might result in injury to the machine. Therefore, if the ejector 66 should not move downwardly and eject the plate at this time the lever arm 181 which is moving downwardly at this time will impinge at the upper end of the spindle 65.

This will prevent the lever 130 from rocking clockwise on the pivot 131 at this time and as the rods 169 together with the switch box 167 and plate 164 are moving upwardly under the action of the cam 179 the pin 132 which is carried by the lever 130 remains stationary while the plate 164 is moving upwardly. As a result, the pin 132 acting in the slanting slot 163 of the plate 164 causes this plate to be shifted from right to left in Figure 7, so that the projecting piece 165 on this plate moves the switch arm 166 from on to off position, thus cutting off the source of current to the motor, which stops the machine.

When the operator removes the cause of the trouble by removing the improperly ejected plate so that the machine is no longer subject to injury, the operator merely moves the switch 166 from off to on position to start the machine in operation again. From what has just been said, it will be apparent that if the ejector fails to operate at the proper time and eject the plate from the mould 63, the machine will be automatically stopped to prevent injury to it.

Power is transmitted from the motor 4 to the shaft 24 through the pinion 5 and gear 6 to the shaft 183; and from there the power is transmitted by the sprocket 184 on the shaft 183, through the endless chain 185 which travels around the sprocket 186 on the shaft 24 to drive the latter.

Power is transmitted from the shaft 24 to the cam shaft 18, by means of the gear 25 on the shaft 24, meshing with and driving the gear 26 on the shaft 18, to drive the latter.

The turret includes a plate 187 mounted on the several radial arms 10 of the turret to lie under the several plate holders and to receive any scrap dough which may be trimmed off the plates. This plate is shown as provided with a central hub-like portion 188 having an aperture through which the central post 9 extends.

Operation

The turret is rotated through the "Geneva" movement 90° at each revolution of the smaller gear of the "Geneva" movement, so that the plate holders of the turret advance in stages from the position A to position D and dwell momentarily at each of these four positions. As stated above, while the plate holder dwells at position A, the pie plate with a sheet of dough on it is deposited so that the plate extends downwardly into the aperture 43 of the ring 41 of the plate holder or in the position shown at the right in Figure 3.

When the plate holder with the dough thereon arrives at position B, the dusting device previously described dusts flour on the top surface of the dough so that the dough will not stick to the rimming device. When the plate holder lies at position C the rim is formed in the dough around the edge of the plate, the excess dough being trimmed off at the same time; and after the several devices forming the trimming mechanism have completed their operation the plate holder advances to position D.

During the time it moves from position C to position D, or at least during part of this time, the wheel 44 engages the arcuate track 45 and as the turret turns about its axis the pulley 44 is caused to revolve by engagement with the track 45 and this revolves the plate holder so that the scraper 46 revolving with the plate holder scrapes the scrap or waste which results from the trimming of the dough around the plate from the top of the plate 187.

As the plate holder starts to advance from the position B back to the position A the plate lifter 39 lifts the plate so that it is in the path of the stationary arm 47, and as the turret continues to revolve, the arm 47 acts to push the plate off the plate holder, leaving the latter empty and ready to receive another plate when the holder returns to position A.

We will here describe the operations which take place at the rimming position, i. e., at the station C. As the plate holder stops at the station C, the plate will be in vertical alignment with the mould 63. As the plate holder approaches this position, the lower end of the spindle 38 enters sidewise into the slot 116 of the shaft 115 so that as the plate holder stops at station C the spindle will be disposed in this slot and in alignment with the axis of the shaft 115. The latter shaft will now be moved upwardly by the action of the cam 117 on the roller 118 so that the plate holder with the plate and the dough carried thereon will be lifted to the position shown in Figure 11. This will cause the plate and the dough thereon to be pressed against the curved side of the mould member 63 which conforms with the shape of the plate.

The mould member co-acting with the plate holder serves to prevent the pie plate from revolving while the rimming operation takes place.

When the plate holder is moved upwardly, as just described, by the upward movement of the shaft 115, the wheel 45 will move toward the locking pin 125 and if this pin happens to align with one of the apertures 124 the pin will be received in that aperture and therefore lock the wheel 44 against revolving, and this will also lock the plate holder from revolving. If the plunger 125 should not register with one of the apertures 124 at the time the plate holder moves upwardly, the plunger will be pressed upwardly against the opposition of its spring 127 and if the plate holder should turn a slight extent the plunger 125 will come to register with one of the apertures 124 and will enter the same, and therefore lock the plate holder against turning any more while the crimping operation is being carried out.

As the plate is carried upwardly by the plate holder into the position shown in Figure 11, the top of the layer of dough will engage the under side of the ejecting member 66 just before the parts come into the position shown in Figure 11 and the ejector plate will be moved upwardly a slight extent as the plate and dough are seated against the mould member 63. The lever 97 is now rocked through the action of the cam 105 on the cam shaft, and the right hand arm of this lever in Figure 3 moves downwardly so that the rollers 99 carried by the lever act on the ring 95 which is attached to the sleeve 92 and cause the sleeve to move downwardly.

The cone shaped cam 93 on the lower end of this sleeve acts on the slanting surface of the cam member 94 which is mounted on the slide 78 and this causes the slide to move from left to right in Figure 13 into the position shown in Figure 11. This movement of the slide 78 within the confines of the guides 77 causes the link 84 to swing slightly on the stud 82 as a center, so that the intermediate gear 86 as well as the gear 86ᵃ swing with the link until the gear 86ᵃ comes into mesh with the stationary gear wheel 72.

The teeth of these two gears are sure to register during this movement because the relation of the gear 86ᵃ to the stationary gear 72 has been preserved by reason of the fact that the gear 83 is always in mesh with the stationary gear 72 and the three gears 83, 86, 86ᵃ are always in mesh with each other. Therefore, when the gear 86ᵃ is brought into mesh with the gear 72 these two gears will be sure to mesh.

The movement of the slide 78 radially in relation to the pie plate also causes the crimping gear 89 to approach the outer edge of the plate and the crimping gear 70 in a direction laterally of the plate instead of approaching from the top as in previous machines. If, during this movement, it should happen that the plate is slightly oversize, or if it is slightly irregular, the cylindrical portion 91 on the under side of the rimming wheel 89 may press laterally against the edge of the plate, and it might even move the plate slightly, that is to say, a fraction of an inch, if the plate is oversize or slightly irregular. As the rimming gears 89, 70 move into the relation shown in Figures 11 and 12, some of the dough on the top of the flange of the plate is pressed into the space between the teeth of these two members, and this dough becomes crimped or scalloped, and conforms with the shape between the two rimming members.

The parts having been brought into the position shown in Figure 11, the following action takes place. The sleeve 74 is being rotated from the shaft 24 through the sprocket 112, the chain 111 and the sprocket 110 which drives the horizontal shaft 109, and through the mitre gears 108, 107 the power from the shaft 24 serves to revolve the sleeve 74. This sleeves carries with it the plate 75 on which the slide is mounted, so that the slide 78, the link 84 and the three gears 83, 86, 86ᵃ all revolve around the axis of the sleeve 74. As the gears 83, 86ᵃ are in mesh with the stationary gear 72 these three gears are caused to revolve in unison with each other.

The shaft 87 on which the gear 86ᵃ is mounted carries the rimming wheel 89 so that the latter revolves around the plate in co-operative relation with the gear 70 formed on the outer edge of the die member. The hub portion 91 of the gear member 86ᵃ rests against the outer edge of the flange of the pie plate and trims off any dough which projects beyond this edge at the same time that the dough is being rimmed. After at least one complete revolution of the shaft 74 the gears will have made one complete movement around the pie plate and will have formed a rim and trimmed the dough. During this operation the plate is held against rotation between the plate holder and the die member 63. However, if the outer edge of the plate should be slightly irregular or oversize, the plate may move laterally, the very slight extent necessary to maintain the edge of the plate in contact with the portion 91 of the gear member 89.

After the gears and slide have made one complete revolution or more, the lever 97 is rocked by the action of the cam 105 in the direction necessary to lift the shaft 74 through the action of the rollers 99 on the arm of the lever. This disengages the circular cam 93 from the cam 94 and the slide 78 will move from left to right in Figure 13 under centrifugal action, although a spring may be employed to cause this return movement if desired. When the slide 78 moves to the left the crimping gear 89 moves away from the crimping member 70 and the gear 86ᵃ moves out of mesh with the stationary gear 72, these gears being movable with the link 84 about the pin 82 as its center, but the gear 83 will continue to mesh with the stationary gear 72 in order that in the next operation the gear 86ᵃ will come into register with the stationary gear.

As soon as the shaft 74 is moved upwardly and the slide is returned to the starting position, the cam 117 will move to such a position as to cause the shaft 115 to move to its lower position and the plate holder will move downwardly and away from the die 63 to the position shown in Figure 3; and it is understood that the plate, together with the rimmed dough will move down with it. In order, however, to insure disengagement of the plate and the dough from the die 63, the ejector 66 moves downwardly a slight extent under the action of the spring to press the plate and dough downwardly until the dough disengages from the surface of the die 63.

If at this time the ejector plate 66 should fail to move downwardly and eject the plate from the die member 63 the arm of the lever 130 will be temporarily held up by the spindle 65 and this will cause the electric switch to be thrown for the purpose of stopping the motor and the machine. If the plate is not ejected from the die 63 and another plate should come into rimming position it might cause injury to the machine but with this automatic stop the machine is stopped if a plate fails to eject. At the end of the above described operations the plate holder will have moved downwardly during the downward movement of the shaft 115 and the rimming operation is completed. The turret then advances 90° to bring a new plate holder into the rimming position.

This movement of the turret causes the spindle 38 of the plate holder which has just been in operative position to move out of the slot 116 of the shaft 115 and as the new plate holder comes into position C its spindle moves into the slot 116. On the next cycle of operations the same function will be performed in regard to the plate now presented as described above. While the turret is making the quarter movement as described, the plate holder on which the dough was rimmed in the first described operation will be revolved by the engagement of the roller 44 with the track 45 so that the scraper 46 will scrape off the scrap dough which may have fallen on the turret top 187.

After one rimming operation has been completed and the slide 78 is moved outwardly to disengage the gear 86ª from the stationary gear 72 the relation of the crimping members will remain until such time as a new plate has been brought into position against the die. From what has been described it will be apparent that the crimping roller 89 moves into and out of operative relation with the crimping roller 70 in a direction laterally of the plate as distinguished from the vertical approach. This feature removes the possibility of the crimping gear crushing the rim of the plate and it insures also the proper engagement of the crimping gear with the plate as hereinbefore set forth.

As far as we are aware this is the first instance where dusting flour has been applied to the top surface of the dough in a pie rimming machine.

Having described our invention, what we claim is:

1. A pie rimming machine having holders to receive and hold pie plates thereon, having a sheet of dough on said pie plates, a mould member for engaging the top of the dough on said plate, a circular toothed member formed adjacent the outer edge of said mould to engage the dough on the rim of the plate, a second toothed member lying in a horizontal position and having teeth co-operating with the teeth of said first toothed member to rim the dough around the edge of the plate, said second toothed member having a cylindrical portion rolling against the outer edge of the plate to rim the dough, and means for moving said second mentioned toothed member laterally into and out of co-operative relation with said first toothed member substantially in the plane of the plate.

2. A pie rimming machine having holders to receive and hold pie plates, having sheets of dough on said plates, a mould member for engaging the top of the dough on said plates, a circular toothed member formed adjacent the outer edge of said mould to engage the dough on the rim of the plate, a second toothed member lying in a horizontal position and having teeth co-operating with the teeth of said first toothed member to rim the dough around the edge of the plate, means for moving said second mentioned toothed member laterally into and out of co-operative relation with said first toothed member substantially in the plane of the plate, and means for causing said second toothed member to planetate around the plate while the latter is stationarily held in said holder.

3. A pie rimming machine including a holder for receiving and holding a pie plate thereon, having a sheet of dough on the pie plate, means co-operating with the pie plate to hold the same non-revolvable, an inner toothed member to engage the dough on the rim of the plate, an outer toothed member co-operating with said inner toothed member to rim the dough around the flange of the plate, a vertical shaft on which said second toothed member is supported, a gear on said shaft, a stationary gear with which said first gear co-operates, means for moving said shaft laterally to move said second toothed member into and out of co-operative relation with said first toothed member substantially in the plane of the plate, and means for rotating said shaft and the parts thereon around the plate whereby said first mentioned gear and said shaft will be operated by said stationary gear, and said second toothed member will planetate around the first toothed member and simultaneously form the rim in the dough on the plate.

4. A pie rimming machine including a holder for receiving and holding a pie plate thereon, having a sheet of dough on the pie plate, means co-operating with the pie plate to hold the same non-revolvable, an inner toothed member to engage the dough on the rim of the plate, an outer toothed member co-operating with said inner toothed member to rim the dough around the flange of the plate, a stationary gear, a chain of gears, one of which is mounted to remain continually in mesh with said stationary gear, another of said chain of gears mounted to move in unison with said second toothed rimming member, means for moving said latter toothed member laterally into and out of co-operative relation with said first rimming member, and means for causing said chain of gears and said second mentioned rimming member to planetate around said stationary gear while the rimming members are in co-operative relation.

5. A pie rimming machine including a holder for receiving and holding a pie plate thereon having a sheet of dough on the pie plate, means co-operating with the pie plate to hold the same non-revolvable, an inner toothed member to engage the dough on the rim of the plate, a stationary gear, a chain of gears mounted on the swinging support, one of said gears remaining continually in mesh with said stationary gear, another of said chain of gears being coupled with said second toothed rimming member, means for rocking said pivotal support to move the second mentioned rimming member laterally into and out of co-operative relation with said first mentioned rimming member and to cause the gear of said chain associated with said second toothed member to move into and out of mesh with said stationary gear, and means to cause said chain of gears to planetate around said stationary gear and said second toothed member to planetate around said first toothed member.

6. A pie rimming machine including a holder for holding a pie plate with a sheet of dough thereon, means co-operating with said plate to hold it non-revolvable, an inner toothed member for rimming the dough around the flange of the plate, an outer toothed member co-operating with said inner toothed member to rim the dough, a stationary gear, a revolvable member having a slide mounted thereon, and cam means for operating said slide, a rocking link pivotally connected with said slide and carrying a chain of gears, one of said chain of gears having its axis at the pivotal point of said link and remaining continually in mesh with said stationary gear, another of said chain of gears being associated with said outer toothed rimming member and adapted to be moved into and out of mesh with said stationary gear by the operation of said slide, and means for revolving said support to cause said chain of gears to planetate around said stationary gear and to cause said outer rimming member to planetate around said inner toothed rimming member.

7. A pie rimming machine including a conveyor and means for operating it step by step, said conveyor having a plurality of holders for receiving pie plates thereon, said holders having shafts mounted to revolve and to reciprocate vertically on said conveyor, said plate holders having ejectors for ejecting the plates therefrom, said ejectors having spindles extending downwardly through and below said holder shaft, a mould against which the pie plate is adapted to be presented by said holders, means for rimming the dough around the pie plate while engaged with said mould, and means for lifting said plate holders, including a vertical shaft having a lateral slot to receive said spindles, and means for periodically reciprocating said shaft.

8. A pie rimming machine including a conveyor having a plurality of holders for receiving pie plates thereon, having sheets of dough on said plates, a vertical shaft, a mould carried by said shaft and against which the pie plate and dough are adapted to be pressed by said holders, a stationary gear carried by said shaft adjacent said mould, a sleeve surrounding said shaft and means for revolving said sleeve, a revolvable member carried by said sleeve, adapted to act on the dough on the rim of the plate to rim the same, a gear associated with said revolvable member and co-operating with said stationary gear on said shaft, said first gear adapted to planetate around said stationary gear as said sleeve is revolved in relation to said shaft.

9. A pie rimming machine including a conveyor having a plurality of holders for receiving pie plates thereon, having sheets of dough on said plates, a vertical shaft, a mould member mounted thereon and against which the pie plate and dough are adapted to be pressed, a rimming member adjacent the outer portion of said mould, a stationary gear mounted on said shaft above the mould, a sleeve surrounding said shaft and means for revolving the same, a revolving rimming member co-operating with said first rimming member to rim the dough around the flange of the plate, a gear associated with said second mentioned rimming member, said gear adapted to revolve with said sleeve whereby said second mentioned gear planetates around and in mesh with said stationary gear, a slider revolvable with said sleeve and adapted to throw said gears into and out of mesh and to move said second rimming member into and out of co-operative relation with said first rimming member, a cam plate on said slider, a second sleeve surrounding said first sleeve, and means for reciprocating with the second sleeve and a cam on said second sleeve acting on said cam plate to operate said slider.

10. A pie rimming machine including a conveyor having holders thereon to receive and hold plates having a sheet of dough thereon, co-operating toothed members co-acting to crimp the rim of dough on said plates, and means for automatically moving one of said toothed members laterally in substantially the plane of the plate into and out of co-operative relation to the other toothed member.

11. A pie rimming machine including a conveyor having holders thereon to receive and hold pie plates having a sheet of dough thereon, co-operating toothed members disposed in planes parallel with the plane of the plate and co-acting to crimp the rim of dough on said plates, and means for automatically causing a relative horizontal, lateral movement between said co-operating toothed members substantially in the plane of the plate to automatically place them into and out of co-operative relation.

12. A pie rimming machine including a conveyor having plate holders thereon to receive and hold pie plates having a sheet of dough thereon, means for moving said conveyor step by step and means adjacent one of the stopping positions of said plate holders, and including co-operating toothed members coacting to crimp the rim of dough on said plates, and means for automatically causing a relative horizontal, lateral movement of said toothed members and substantially in the plane of the plate to place them automatically into and out of co-operative relation.

13. A pie rimming machine including a conveyor having holders thereon to receive and hold plates having a sheet of dough thereon, a toothed member for engaging the dough on the rim of the plate from the inside, a co-operating toothed member for engaging the dough on the rim of the plate from the outside and in co-operative relation with said inner toothed member whereby the dough is crimped between the said toothed members, and means for automatically moving said outer toothed member horizontally toward and from said inner toothed member substantially in the plane of the plate to automatically place the toothed members into and out of co-operative relation.

ARTHUR E. CLARK.
JOHN F. KOHLER.